(12) United States Patent
Miyazaki (10) Patent No.: US 11,663,316 B2
(45) Date of Patent: May 30, 2023

(54) ELECTRONIC DEVICE AND CONTROL METHOD

(71) Applicant: CANON KABUSHIKI KAISHA, Tokyo (JP)

(72) Inventor: Sho Miyazaki, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 101 days.

(21) Appl. No.: 17/329,918

(22) Filed: May 25, 2021

(65) Prior Publication Data
US 2021/0373083 A1 Dec. 2, 2021

(30) Foreign Application Priority Data

May 28, 2020 (JP) .............................. JP2020-093675

(51) Int. Cl.
*G06F 21/44* (2013.01)
*G06F 13/10* (2006.01)
*G06F 21/73* (2013.01)
*G01R 31/382* (2019.01)

(52) U.S. Cl.
CPC ............ *G06F 21/44* (2013.01); *G06F 13/102* (2013.01); *G06F 21/73* (2013.01); *G01R 31/382* (2019.01); *G06F 2221/2129* (2013.01)

(58) Field of Classification Search
CPC ........ G06F 21/44; G06F 13/102; G06F 21/73; G06F 2221/2129; G01R 31/382
See application file for complete search history.

(56) References Cited

U.S. PATENT DOCUMENTS

| 7,667,429 B2* | 2/2010 | Little ................... H04L 9/3271 713/160 |
| 2007/0214296 A1* | 9/2007 | Takamatsu ............ H02J 7/0031 710/63 |
| 2009/0256717 A1* | 10/2009 | Iwai ......................... G06F 1/26 700/295 |
| 2015/0189168 A1* | 7/2015 | Tanaka ............... H04N 5/23241 348/231.6 |
| 2016/0294206 A1* | 10/2016 | Okawa ................ H02J 7/00047 |
| 2017/0053501 A1* | 2/2017 | Kamiwano ............. G06F 21/44 |
| 2017/0103197 A1* | 4/2017 | Degura .................... G06F 1/26 |
| 2017/0104361 A1* | 4/2017 | Sato ........................ G05B 15/02 |
| 2018/0048249 A1* | 2/2018 | Ikeda ................... H02J 7/00036 |
| 2019/0033937 A1* | 1/2019 | Inoue .................. H02J 7/00038 |
| 2019/0223277 A1* | 7/2019 | Saito ...................... H05B 41/30 |

FOREIGN PATENT DOCUMENTS

| JP | 2008-193784 A | 8/2008 |
| JP | 2008193784 A * | 8/2008 |

OTHER PUBLICATIONS

Furtner et al., "BIF—Battery Interface Standard for Mobile Devices" 2013 IEEE (Year: 2013).*

* cited by examiner

*Primary Examiner* — John C Kuan
(74) *Attorney, Agent, or Firm* — Canon U.S.A., Inc. IP Division (57) ABSTRACT

An electronic device includes a communication unit that communicates with a battery, a storage unit that stores a first identification information of the battery, and a determination unit that determines whether the communication unit is capable of performing a predetermined communication with the battery, in a case where a second identification information of the battery received from the battery is matched with the first identification information stored in the storage unit.

20 Claims, 8 Drawing Sheets

ELECTRONIC DEVICE AND CONTROL METHOD

BACKGROUND

Field of the Disclosure

Aspects of the disclosure generally relate to an electronic device capable of communicating with a battery, and a method of controlling the electronic device.

Description of the Related Art

Japanese Patent Laid-Open No. 2008-193784 describes an electronic device that is capable of communicating with a battery and performing control in accordance with the type of the battery.

However, according to Japanese Patent Laid-Open No. 2008-193784, after continuous use of the battery, a predetermined communication may not be able to be performed between the electronic device and the battery due to some sort of defect. In this case, there is a possibility that information concerning the battery necessary for controlling the electronic device cannot be obtained, and thus the electronic device or the battery cannot be controlled appropriately.

SUMMARY

According to various embodiments, an electronic device can be controlled depending on whether predetermined information has been obtained from a battery.

According to various embodiments, an electronic device is provided that includes a communication unit that communicates with a battery; a storage unit that stores a first identification information of the battery; and a determination unit that determines whether the communication unit is capable of performing a predetermined communication with the battery, in a case where a second identification information of the battery received from the battery is matched with the first identification information stored in the storage unit.

According to various embodiment, there is provided a method that includes communicating with a battery via a communication unit of an electronic device; and determining whether the communication unit is capable of performing a predetermined communication with the battery, in a case where a second identification information of the battery received from the battery is matched with a first identification information stored in a storage unit of the electronic device.

Further aspects of embodiments of the disclosure will become apparent from the following description of exemplary embodiments.

DESCRIPTION OF THE EMBODIMENTS

Exemplary embodiments, features, and aspects of the disclosure will be described below with reference to the drawings. However, aspects of the disclosure are not limited to the following embodiments.

Figure 1:
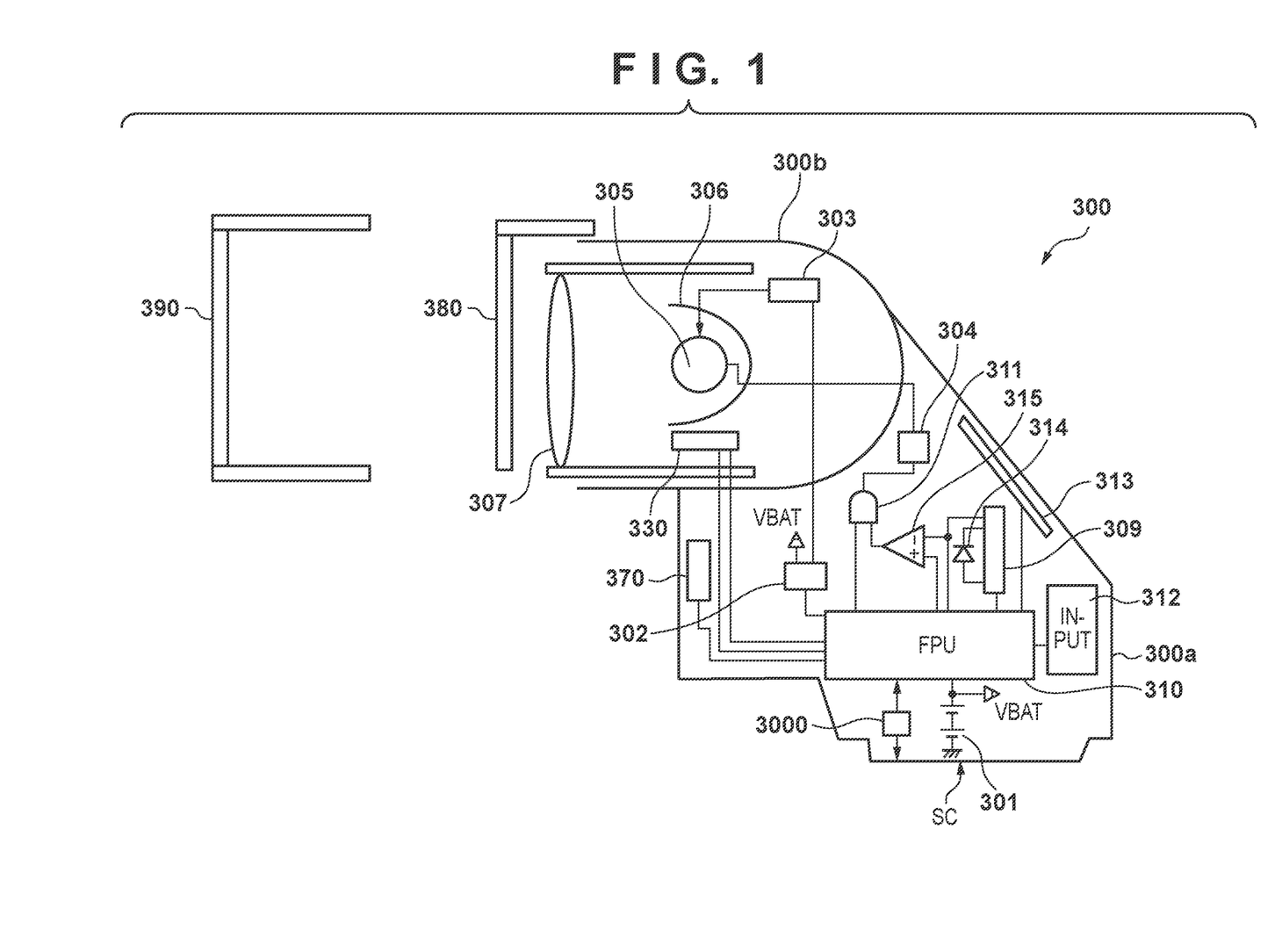
FIG. 1 is a cross-sectional side view illustrating elements of a flash 300 according to a first embodiment.
Figure 2:
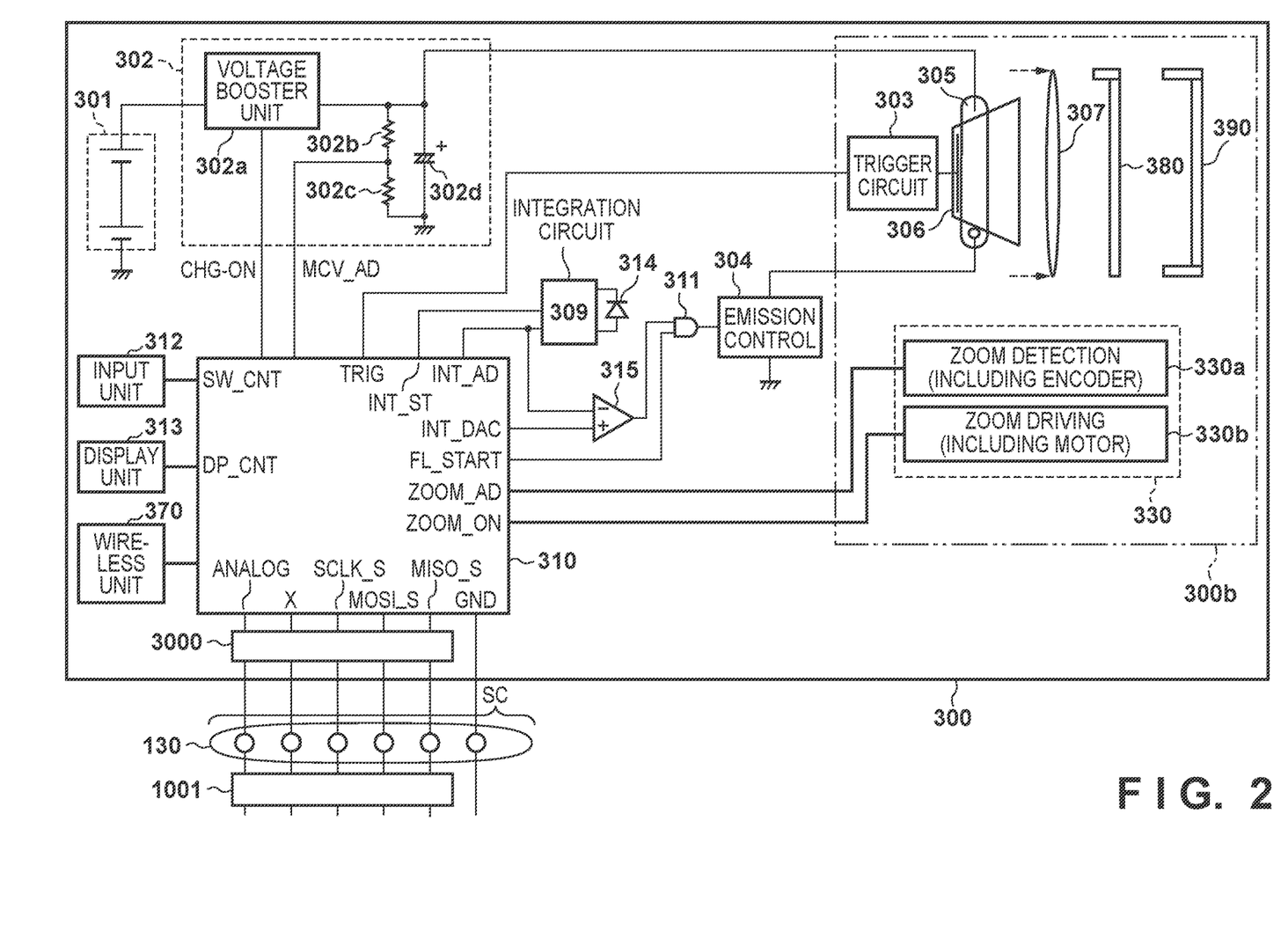
FIG. 2 is a block diagram illustrating the elements of the flash 300 according to the first embodiment.

[First Embodiment] FIG. 1 is a cross-sectional side view illustrating elements of a flash 300, which is one example of an electronic device according to a first embodiment, and FIG. 2 is a block diagram also illustrating elements of the flash 300. The flash 300 is attachable to or detachable from an image capture apparatus. Note that in FIG. 1 and FIG. 2, use of the same reference numeral denotes the same functional portion.

First, the elements of the flash 300 will be described. The flash 300 includes a main body portion 300a that is attachably and detachably connected to the image capture apparatus, and a movable portion 300b that is held rotatably in the up-and-down directions and the left-and-right directions relative to the main body portion 300a.

A control processor 310 controls the elements of the flash 300. The control processor 310 has a single chip IC that includes, for example, a CPU, a ROM, a RAM, an input/output control circuit (I/O control circuit), a multiplexer, a timer circuit, an EEPROM, an A/D converter, a D/A converter, or the like. A battery ID of a battery 301 (corresponding to identification information of the battery 301), which will be described later, is stored in the EEPROM inside the control processor 310 for the flash 300. A process for storing the battery identification information will be described later with reference to FIG. 4.

An interface circuit 3000 of the flash 300 communicates with a control processor of the image capture apparatus via terminals 130 illustrated in FIG. 2. The battery 301, which is connected to the outside of the flash 300, functions as a power source (VBAT) for the flash 300.

Figure 3:
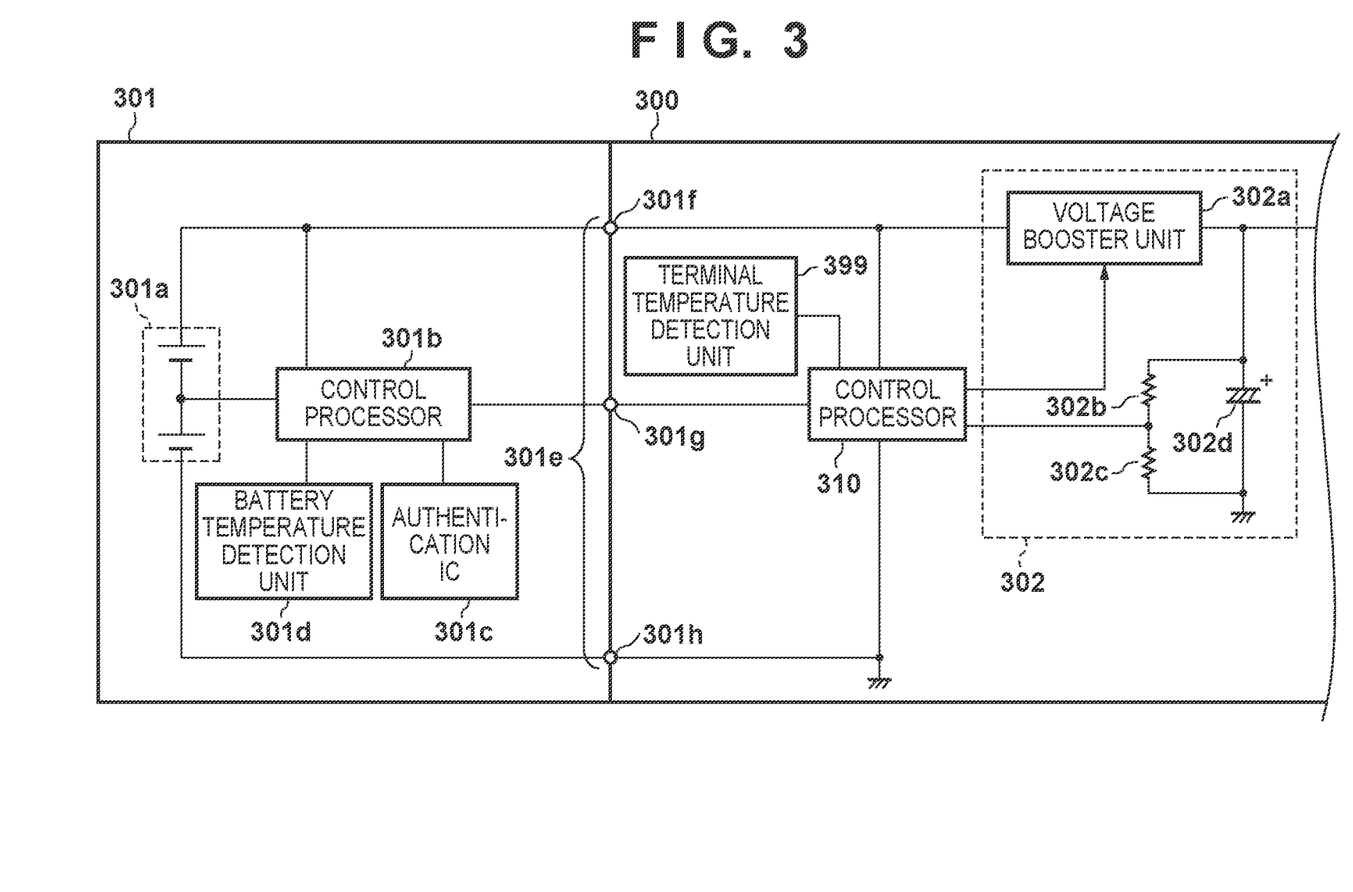
FIG. 3 is a block diagram illustrating elements of a battery 301 according to the first embodiment.

FIG. 3 is a block diagram illustrating elements of the battery 301 and some elements of the flash 300. The elements of the battery 301 will be described with reference to FIG. 3.

The battery 301 is a battery with a communication function, and includes a battery cell 301a, a protection circuit that performs monitoring of over discharge or the like, and a control processor 301b.

The control processor 301b includes a single chip microcomputer; inside the control processor 301b, there are a communication function unit and a remaining level detection unit that performs monitoring of the remaining battery level of the battery 301. The control processor 301b obtains and records various types of battery information, forms the various types of battery information into communication data, and transmits the communication data to the control processor 310 of the flash 300. Furthermore, the control processor 301b, in coordination with an authentication IC 301c of the battery 301, transmits encryption information for battery authentication to the control processor 310. Using this encryption information, the control processor 310 performs a battery authentication process. A temperature detection unit 301d of the battery 301 detects the temperature of the battery 301, and notifies the control processor 301b of temperature information indicating the detected temperature.

A connector 301e is arranged on an external package of the battery 301; the connector 301e includes a terminal 301f connected to a positive electrode of the battery cell 301a, and a terminal 301h connected to a negative electrode of the battery cell 301a. The connector 301e further includes a communication terminal 301g connected to a communication port of the control processor 301b. Terminals of a connector on the flash 300 side that respectively correspond to the foregoing terminals are connected to the control processor 310 of the flash 300, and the supply of electricity from the battery 301 to the flash 300 and communication between the battery 301 and the flash 300 are performed via the terminals.

A terminal temperature detection unit 399 detects the temperature of the connector 301e that is disposed in the vicinity of the battery 301, and notifies the control processor 310 of the detected temperature.

The flash 300 includes an electricity storage unit 302 shown in FIG. 2 and FIG. 3, which includes a voltage booster unit 302a, resistors 302b and 302c used for voltage detection, and a main capacitor 302d. The electricity storage unit 302 charges the main capacitor 302d by increasing the voltage of the battery 301 to several hundred volts with use of the voltage booster unit 302a, and stores the voltage as electrical energy for light emission. The voltage booster unit 302a can change current from the battery 301 in accordance with a control signal (a signal that issues an instruction on the ON time of an FET) from the control processor 310. The charge voltage of the main capacitor 302d is divided by the resistors 302b and 302c, and the divided voltages are input to an A/D conversion terminal of the control processor 310.

The flash 300 includes a trigger circuit 303, which applies a pulse voltage to the discharge tube 305. A light emission control circuit 304 controls the start and cessation of light emission of the discharge tube 305. Upon receiving a pulse voltage of several kV applied by the trigger circuit 303, the discharge tube 305 is excited, discharges the electrical energy with which the main capacitor 302d has been charged, and emits light.

An integration circuit 309 of the flash 300 integrates a current of light received by a photodiode 314, and the output thereof is input to an inverting input terminal of a comparator 315 and an A/D converter terminal of the control processor 310 of the flash 300. A non-inverting input terminal of the comparator 315 is connected to a D/A converter terminal inside the control processor 310, and an output terminal of the comparator 315 is connected to an input terminal of an AND gate 311. A light emission control terminal (FL_START) of the control processor 310 is connected to another input terminal of the AND gate 311, and the output of the AND gate 311 is input to a light emission control circuit 304. Note that the photodiode 314 is a sensor that receives light emitted from the discharge tube 305, and receives light emitted from the discharge tube 305 either directly or via glass fibers or the like.

A reflective umbrella 306 reflects light emitted from the discharge tube 305, and directs the reflected light toward a predetermined direction. A zoom optical system 307, which includes an optical panel or the like, is held in such a manner that its position relative to the discharge tube 305 is changeable; changing the relative positions of the discharge tube 305 and the zoom optical system 307 enables the guide number and the irradiation range of the flash 300 to be changed.

A light emission unit of the flash 300 includes the discharge tube 305, the reflective umbrella 306, and the zoom optical system 307. The irradiation range of the light emission unit of the flash 300 is changed by the movement of the zoom optical system 307, and the irradiation direction of the light emission unit of the flash 300 is changed by the rotation of the movable portion 300b.

An input unit 312 of the flash 300 includes such operation units as a power switch, a mode setting switch for setting an operation mode of the flash 300, and setting buttons for setting various types of parameters, and the control processor 310 executes various types of processes in accordance with inputs to the input unit 312. An operation unit for changing the settings of light adjustment correction of the flash 300 is also included in the input unit 312. A display unit 313 displays various states of the flash 300. An LED for providing a warning display when light is falling below the lower limit of the light adjustment range is also included in this display unit 313.

A zoom driving circuit 330 of the flash 300 includes a zoom detection unit 330a that detects information related to the relative positions of the discharge tube 305 and the zoom optical system 307 with use of an encoder or the like, and a zoom driving unit 330b that includes a motor for moving the zoom optical system 307. The control processor 310 obtains focal length information output from a control processor of a lens unit via the control processor of the image capture apparatus, and the control processor 310 calculates a driving amount of the zoom optical system 307 based on this focal length information so that the driving amount of the zoom optical system 307 is determined. Alternatively, the control processor 310 drives the zoom optical system 307 so that the zoom optical system 307 is situated at a position designated by a user via the input unit 312.

The flash 300 can be controlled via wireless communication using wireless unit 370. A wide panel 380 is an optical member that is arranged in front of the light emission unit of the flash 300 along the irradiation direction and enlarges the irradiation range of the light emission unit. For use, the wide panel 380 is manually pulled out from the light emission unit. A bounce adapter 390 is an optical member that acts as a cover positioned in front of the light emission unit along the irradiation direction and enlarges the irradiation range of the light emission unit. Note that whereas the wide panel 380 diffuses emitted light frontward, the bounce adapter 390 diffuses emitted light upward, downward, leftward, and rightward, and does not cause the irradiation of intense light frontward.

Communication lines SC shown in FIGS. 1 and 2 are communication lines for connection between the flash 300 and the image capture apparatus. For example, the image capture apparatus and the flash 300 mutually exchange data, transmit commands, and so forth via the communication lines SC.

FIG. 2 shows the terminals 130 based on three-terminal serial communication as examples of the communication lines SC. The terminals 130 are connected to the control processor of the image capture apparatus via an interface circuit 1001. The terminals 130 include an SCLK_S terminal for achieving synchronization in communication between the image capture apparatus and the flash 300, an MOSI_S terminal for transmitting data from the image capture apparatus to the flash 300, and an MISO_S terminal for transmitting data from the flash 300 to the image capture apparatus. Similarly to an accessory shoe or the like, the terminals 130 are terminals for connecting such accessories as the flash 300 to the image capture apparatus. The terminals 130 also include a GND terminal for connection between the image capture apparatus and the flash 300.

In transmitting data from the control processor of the image capture apparatus to the control processor 310, data pieces are serially transmitted by inputting each bit to the MOSI_S terminal in the form of 0 or 1 in synchronization with an 8-bit clock of the SCLK_S terminal. On the other hand, in transmitting data from the control processor 310 to the control processor of the image capture apparatus, data pieces are serially transmitted by outputting each bit from the MISO_S terminal in the form of 0 or 1 in synchronization with the 8-bit clock of the SCLK_S terminal. Reading and writing of signals are performed at the rising timings of SCLK_S signals via 8-bit (1-byte) communication. Then, this 8-bit communication is performed repeatedly for a command, command data, and data.

Figure 4:
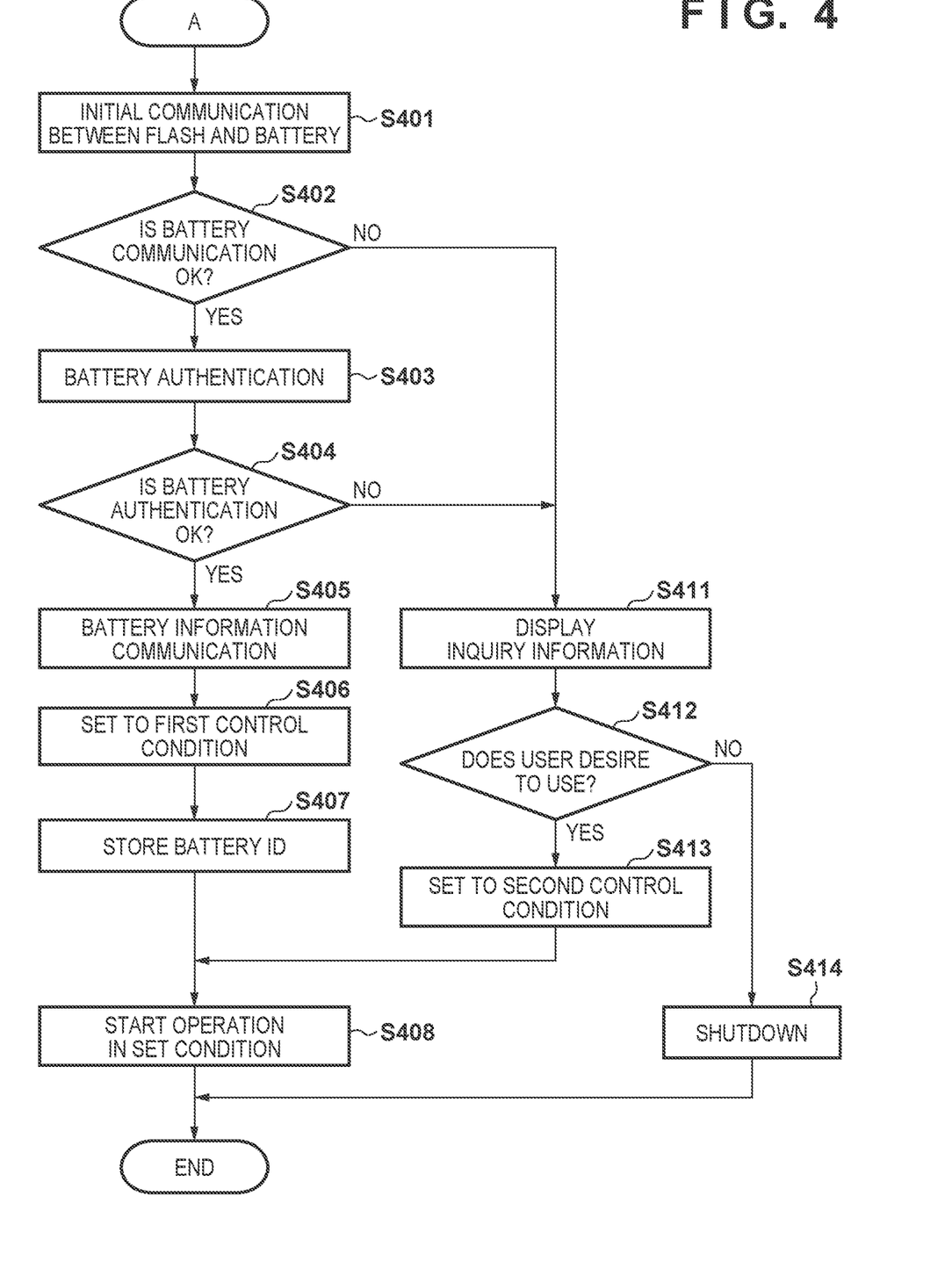
FIG. 4 is a flowchart for describing a process of storing identification information of the battery 301.

FIG. 4 is a flowchart for describing a process of causing the flash 300 to store the battery ID of the battery 301 (corresponding to the identification information of the battery 301). The process illustrated in the flowchart of FIG. 4 starts when the battery 301 is connected to the flash 300 and the control processor 310 of the flash 300 is activated. The process proceeds to step S401 of FIG. 4 from step S111 of the flowchart illustrated in FIG. 7, which will be described herein below; however, as the intention here is to describe the process of causing the flash 300 to store the identification information of the battery 301, step S401 is a useful start point.

In step S401, the control processor 310 of the flash 300 attempts to communicate with the control processor 301b of the battery 301. At this time, the control processor 310 transmits, to the control processor 301b, a request for transmission of the type name, the identification information, and other information of the battery 301.

In step S402, the control processor 310 determines whether the battery 301 is a communication enabled battery. For example, this determination is made based on whether a response signal has been returned from the control processor 301b, and on whether appropriate reply data has been transmitted, in response to the information that was requested by the control processor 310 to the control processor 301b in step S101. When appropriate reply data has been transmitted, the process proceeds to step S403; on the other hand, when there has been no response signal or when the reply data is not appropriate, the process proceeds to step S411.

In step S403 and step S404, the control processor 310 of the flash 300 performs a battery authentication process, and determines whether the battery 301 is a battery capable of performing appropriate communication. A predetermined encryption code is transmitted from the control processor 310, and whether the content of a response signal from the control processor 301b is appropriate is determined. When the content is appropriate, the process proceeds to step S405. When the content is not appropriate, the process proceeds to step S411.

In step S405, the control processor 310 of the flash 300 requests the control processor 301b of the battery 301 to transmit the remaining battery level of the battery 301, the degree of deterioration of the battery 301, and the temperature of the battery 301, which are to be used for display of battery information and control. The control processor 301b returns the requested information to the control processor 310. Note that the communication of information is performed in step S405, and display of the battery information and other information is performed in step S408.

In step S406, based on the temperature information of the battery 301 obtained in step S405, the control processor 310 sets the temperature detection unit to be used in control and sets a control condition for the flash 300. Here, a first control condition with few restrictions is set as the control condition for the flash 300.

Now, control conditions for the flash 300 will be briefly explained. For a case where the battery 301 is a communication enabled battery capable of performing appropriate communication, a first control condition with few restrictions is used as the control condition, whereas for a case where the battery 301 is a communication disabled battery or a battery incapable of performing appropriate communication, a second control condition with many restrictions is used as the control condition. Here, the second control condition is, for example, one of the following control conditions: a control condition whose setting value of an operation prohibition voltage that prohibits operation of the electronic device is higher than that of the first control condition; a control condition whose operation current value of the electronic device is lower than that of the first control condition; a control condition whose temperature setting value that restricts operation of the electronic device is different from that of the first control condition; and a control condition whose temperature detection unit used in restricting operation of the electronic device is different from that of the first control condition.

In step S407, the control processor 310 stores the identification information of the battery 301 obtained in step S401 into the EEPROM inside the control processor 310.

In step S408, the control processor 310 starts control of the flash 300 under the first control condition that was set in step S406. Here, the control processor 310 also causes the display unit 313 to display the remaining battery level of the battery 301 based on the information of the battery received in step S405. Furthermore, when the display unit 313 of the flash 300 is capable of displaying detailed battery information, the control processor 310 causes the display unit 313 to display the remaining battery level of the battery 301, the degree of deterioration of the battery 301, and other information as the battery information.

Figure 5A:
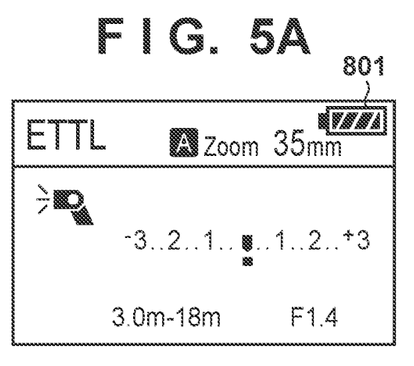
FIGS. 5A to 5D are diagrams illustrating examples of battery information for giving notification of information related to the battery 301.
Figure 5B:
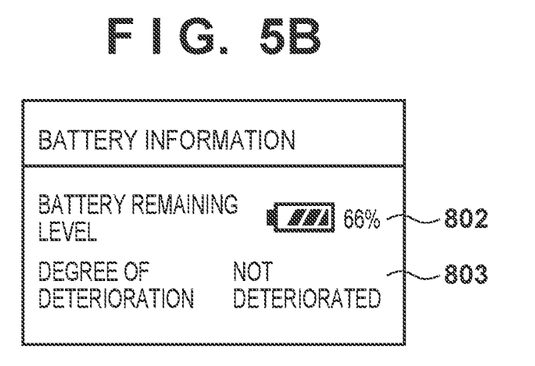

FIGS. 5A to 5D are diagrams illustrating examples of battery information. FIG. 5A shows an example of battery information for a case where the battery 301 has been determined to be a communication enabled battery capable of performing appropriate communication. Based on the remaining battery level information obtained through communication with the battery 301, the control processor 310 displays a battery icon 801 in an upper right section of the display unit. FIG. 5B shows an example of battery information for a case where the flash 300 is capable of displaying detailed battery information. Display information 802 indicating the remaining battery level of the battery 301 in percentage, a degree of deterioration 803, and other information are displayed.

Figure 6:
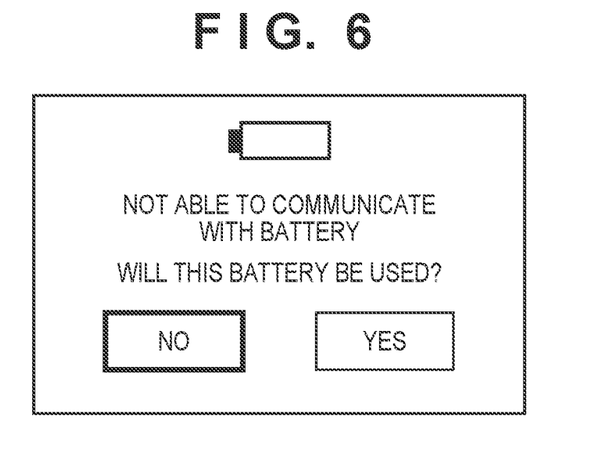
FIG. 6 is a diagram illustrating an example of an inquiry information related to a communication disabled battery.

On the other hand, when the battery 301 is determined to be a communication disabled battery in step S402, or when the content of the response from the battery 301 is not appropriate in step S404, the control processor 310 displays inquiry information in step S411; an example of such inquiry information is shown in FIG. 6. That is, an announcement "Communication cannot be performed with battery" is displayed to the user, and at the same time, an inquiry "Do you want to use this battery?" is presented to the user asking the user to input a selection "YES" or "NO".

In step S412, the control processor 310 determines whether the input from the user indicates that the user desires to use the battery in question or does not desire to use the battery. When the user desires to use the battery, the process proceeds to step S413 (YES of step S412); when the user does not desire to use the battery, the process proceeds to step S414 (NO of step S412).

In step S413, the control processor 310 controls the flash 300 based on the output from the terminal temperature detection unit 399. Here, control is performed under the second control condition with many restrictions. After the control condition is set in step S413, a transition is made to step S408, and the control processor 310 starts control of the flash 300 under the set control condition.

Figure 5C:
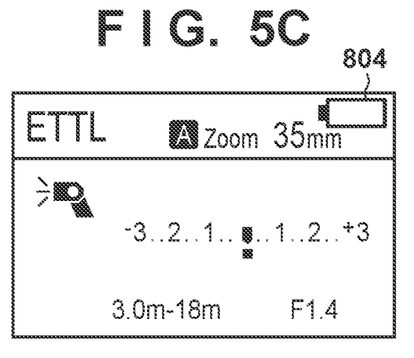
Figure 5D:
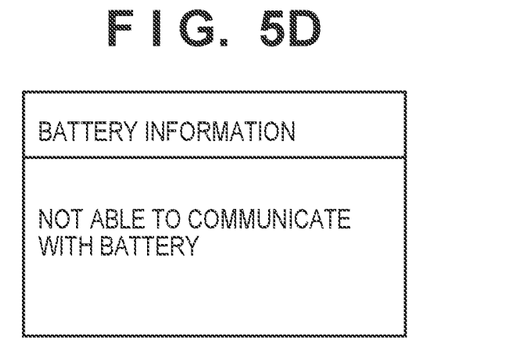

FIG. 5C shows an example of battery information for a case where the process has proceeded to step S408 by way of step S413. In this case, as the battery 301 has been determined to be a communication disabled battery, or as the battery 301 has been determined to be a battery incapable of performing appropriate communication, the control processor 310 cannot display the remaining battery level of the battery 301, and display information 804 indicating that the remaining battery level of the battery 301 is "empty" is used instead as the battery icon. FIG. 5D shows another example of battery information for a case where the process has proceeded to step S408 by way of step S413. As the information of the battery cannot be obtained, or as communication is not appropriate, "Communication cannot be performed with battery" is displayed to notify the user of the status.

When the user does not desire to use this battery (has selected NO in step S412) as a result of the control processor 310 determining the result of the input from the user in step S412, the process proceeds to step S414, and the control processor 310 performs a shutdown process.

The foregoing is the description of the process of causing the control processor 310 to store the identification information of the battery 301.

Figure 7:
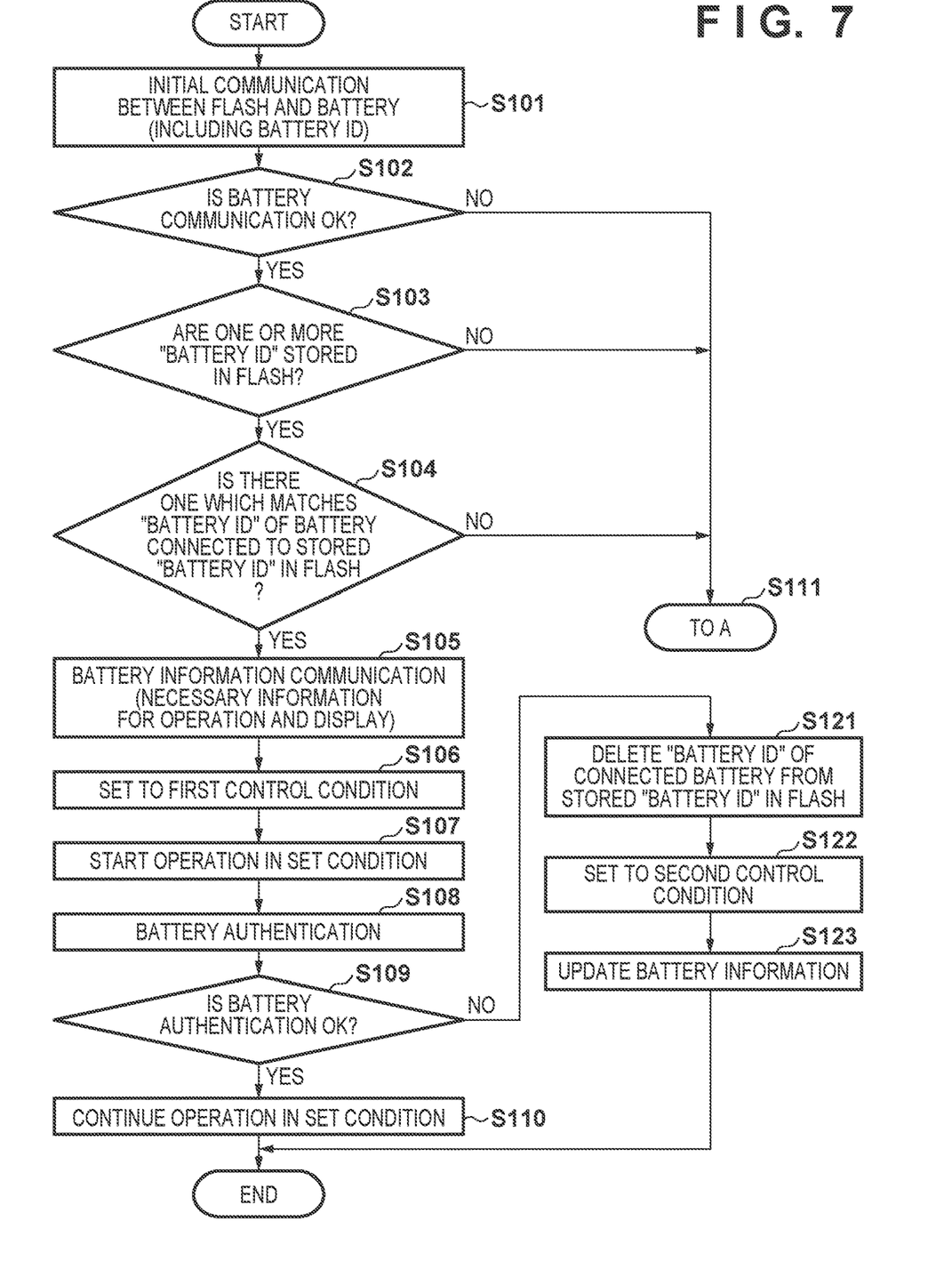
FIG. 7 is a flowchart for describing operation of the flash 300 according to the first embodiment.

Next, FIG. 7 is a flowchart for describing operation of the flash 300 according to the first embodiment. The operation of the flash 300 will be described with reference to FIG. 7. The process illustrated in the flowchart of FIG. 7 starts when the battery 301 is connected to the flash 300 and the control processor 310 is activated.

In step S101, the control processor 310 attempts to communicate with the control processor 301b. At this time, the control processor 310 transmits, to the control processor 301b, a request for transmission of the type name, the identification information, and other information of the battery 301.

In step S102, the control processor 310 determines whether the battery 301 is a communication enabled battery. For example, this determination is made based on whether a response signal has been transmitted from the control processor 301b, or whether appropriate reply data has been transmitted, in response to the information that was requested by the control processor 310 to the control processor 301b in step S101. When appropriate reply data has been transmitted, the process proceeds to step S103; when appropriate reply data has not been transmitted, the process proceeds to step S111. After the process proceeds to step S111 of FIG. 7, the process continues with the aforementioned step S401 of FIG. 4. The process of step S401 onward is as described above in connection with the discussion of FIG. 4. Although the process proceeds to step S111 also via branching in step S103 or step S104, as this is similar to the case of step S102, a description of the processes after the transition is omitted.

In step S103, the control processor 310 determines whether one or more identification information of the battery 301 are stored in the EEPROM inside the control processor 310. When one or more identification information are stored, the process proceeds to step S104; when one or more identification information are not stored, the process proceeds to step S111.

In step S104, the control processor 310 compares the battery ID of the battery 301 received in step S101 with the battery IDs of the battery 301 stored inside the EEPROM. When the stored identification information of the battery 301 include identification information that is matched with the identification information of the battery 301 received in step S101, the process proceeds to step S105. When the stored identification information of the battery 301 does not include identification information that is matched with the identification information of the battery 301 received in step S101, the process proceeds to step S111.

In step S105, the control processor 310 requests the control processor 301b to transmit the remaining battery level of the battery 301, the degree of deterioration of the battery 301, and the temperature of the battery 301, which are to be used for display of battery information and control. The control processor 301b returns the requested information to the control processor 310. Note that the communication of information is performed in step S105, and display of the battery information and other information is performed in step S107. Furthermore, here, the control processor 310 also obtains the output from the terminal temperature detection unit 399.

In step S106, the control processor 310 sets a control condition for the flash 300 to a first control condition with few restrictions, and sets conditions to be used in control based on the battery temperature information obtained in step S105.

In step S107, the control processor 310 starts control of the flash 300 under the first control condition that was set in the step S106. Here, the control processor 310 also causes the display unit 313 to display the remaining battery level of the battery 301 based on the information of the battery received in step S105. Also, when the display unit 313 of the flash 300 is capable of displaying detailed battery information, the control processor 310 causes the display unit 313 to display the remaining battery level of the battery 301, the degree of deterioration of the battery 301, and other information as the battery information.

As discussed hereinabove, FIGS. 5A to 5D are diagrams for describing examples of battery information.

In step S108 and step S109, the control processor 310 performs a battery authentication process, and determines whether the battery 301 is a battery capable of performing appropriate communication. A predetermined encryption code is transmitted from the control processor 310, and whether the content of a response signal from the control processor 301b is appropriate is determined. When the content is appropriate, the process proceeds to step S110. When the content is not appropriate, the process proceeds to step S121.

In step S110, the control processor 310 determines to continue control under the first control condition that was set in step S106 and started in step S107, and ends the process illustrated in the flowchart of FIG. 7.

In step S121, the control processor 310 deletes the identification information of the currently connected battery 301, which was obtained in step S101, from the identification information of the battery 301 stored in the EEPROM of the control processor 310.

In step S122, the control processor 310 sets a control condition for the flash 300 to a second control condition with many restrictions, and controls the flash 300 based on the output from the terminal temperature detection unit 399 obtained in step S105.

In step S123, the control processor 310 updates battery information indicating the remaining battery level of the battery 301, which is displayed on the display unit 313, to battery information indicating that the battery 301 is not a communication enabled battery or the battery 301 is a battery incapable of performing appropriate communication.

As described hereinabove, FIG. 5C shows an example of battery information for this case. As described above, in this case, as the battery 301 has been determined to be a communication disabled battery, or as the battery 301 has been determined to be a battery incapable of performing appropriate communication, the control processor 310 cannot display the remaining battery level of the battery 301, and display information 804 indicating that the remaining battery level of the battery 301 is "empty" is used as the battery icon. FIG. 5D shows another example of battery information for this case. As the information of the battery cannot be obtained, or as communication is not appropriate, "Communication cannot be performed with battery" is displayed to notify the user to that effect. After step S123, the process illustrated in the flowchart of FIG. 7 ends.

As described above, according to the first embodiment, the identification information of the connected battery 301 is compared with the identification information of the battery 301 stored in the control processor 310, and when the former is matched with the latter as a result of the comparison, the flash 300 is brought into operation. Furthermore, thereafter, whether the battery 301 is capable of performing appropriate communication is still determined. In this way, even in a case where some sort of communication failure occurs on an electronic device that starts processes based on received identification information of a battery 301, control can be performed in accordance with the result of a determination about whether the battery 301 has a communication function and the result of a determination about whether the communication function is normal.

Furthermore, it is determined whether the communication function of the battery 301 is normal, and when the result of the determination is negative, rather than stopping the operation of the flash 300 and providing a warning display, the control condition is changed to a condition with more restrictions (the second control condition). This enables the user to continuously use the flash 300 even where communication failures occur, for example.

[Second Embodiment] According to the first embodiment, the operation of the flash 300 are started when the battery ID of the connected battery 301 is stored in the flash 300. In the described example, whether the communication function is normal is determined thereafter, and when the result of the determination is negative, the identification information is deleted.

In contrast, according to a second embodiment, the timing of deletion of the identification information of the battery 301 differs from that of the first embodiment. For example, the identification information of the battery 301 is deleted immediately after operation of the flash 300 is started, and whether the communication function of the battery 301 is normal is determined thereafter. When the communication function of the battery 301 has been determined to be normal, the identification information of the battery 301 is stored again. According to the first embodiment, after the operation of the flash 300 is started based on the identification information of the battery 301, if the removal of the battery 301 is repeated before the end of the determination about whether the communication function is normal, a problem can occur that the control condition for the flash 300 cannot be updated even after the result of the determination about whether the communication function is normal is negative. In contrast, the second embodiment can prevent such a problem.

Figure 8:
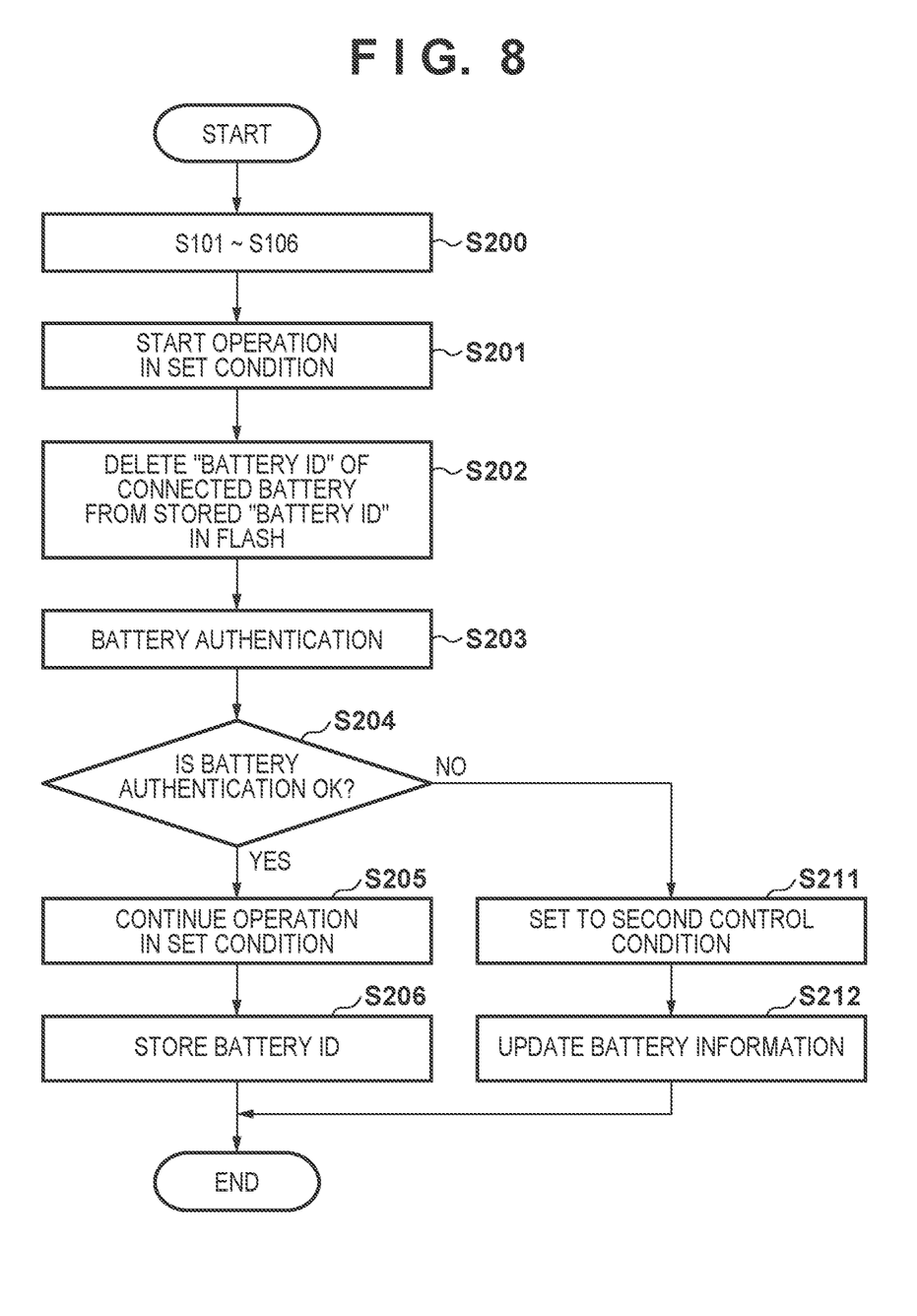
FIG. 8 is a flowchart for describing operation of the flash 300 according to a second embodiment.

FIG. 8 is a flowchart for describing the operation of the flash 300 according to the second embodiment. Processes of step S200 of FIG. 8 are the same as the processes of steps S101 to S106 of FIG. 7, and thus a description of these processes is omitted.

In step S201, similarly to step S107 of FIG. 7, the control processor 310 starts control of the flash 300 under the first control condition that was set in the step S106.

In step S202, the control processor 310 deletes the identification information of the currently connected battery 301, which was obtained in step S101, from the identification information of the battery 301 stored in the EEPROM inside the control processor 310.

In step S203 and step S204, the control processor 310 determines whether the communication enabled battery 301 is capable of performing appropriate communication. A predetermined encryption code is transmitted from the control processor 310, and whether the content of a response signal from the control processor 301b is appropriate is determined. When the content is appropriate, the process proceeds to step S205. When the content is not appropriate, the process proceeds to step S211.

In step S205, the control processor 310 determines to continue control under the first control condition that was started in step S201, and then the process proceeds to step S206.

In step S206, the control processor 310 stores the identification information of the battery 301 obtained in step S101 into the EEPROM inside the control processor 310, and ends the process illustrated in the flowchart of FIG. 8.

When the process proceeds from step S204 to step S211, in step S211, the control processor 310 sets a control condition for the flash 300 to the second control condition, and controls the flash 300 based on the output from the terminal temperature detection unit 399 obtained in step S105.

In step S212, the control processor 310 updates battery information indicating the remaining battery level of the battery 301, which is displayed on the display unit 313, to battery information indicating that the battery 301 is a communication disabled battery or the battery 301 is a battery incapable of performing appropriate communication (FIG. 5C). Thereafter, the process illustrated in the flowchart of FIG. 8 is ended.

As described above, according to the second embodiment, the identification information of the battery 301 is deleted immediately after the operation of the flash 300 is started based on the identification information of the battery 301, and whether the communication function is normal is determined thereafter. This can prevent the problem that the control condition for the flash 300 cannot be updated even after the result of the determination about whether the communication function is normal is negative.

[Third Embodiment] According to a third embodiment, the determination about whether the communication function is normal is started after operation of the flash 300 is started based on the identification information of the battery 301. Then, the identification information of the battery 301 is deleted when a predetermined operation has been performed before this determination is ended.

Figure 9:
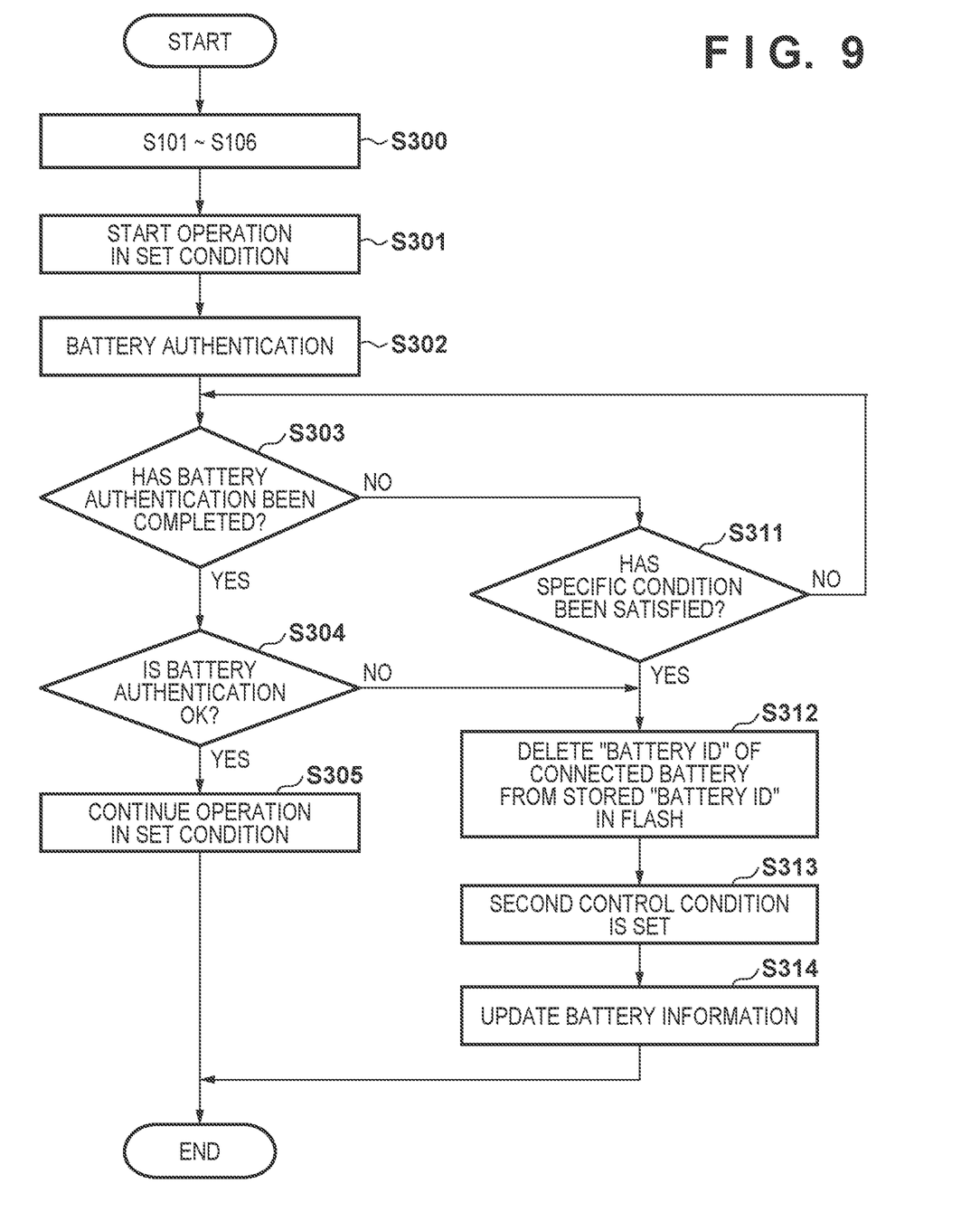
FIG. 9 is a flowchart for describing operation of the flash 300 according to a third embodiment.

FIG. 9 is a flowchart for describing the operation of the flash 300 according to the third embodiment. Processes of step S300 of FIG. 9 are the same as the processes of steps S101 to S106 of FIG. 7, and thus a description of these processes is omitted.

In step S301, similarly to step S107 of FIG. 7, the control processor 310 starts control of the flash 300 under the first control condition that was set in the step S106.

In step S302, the control processor 310 starts the determination about whether the communication enabled battery 301 is capable of performing appropriate communication. A predetermined encryption code is transmitted from the control processor 310, and whether the content of a response signal from the control processor 301b is appropriate is determined.

In step S303, the control processor 310 determines whether the determination that was started in step S302 has been completed. When the determination has been completed, the process proceeds to step S304; when the determination has not been completed, the process proceeds to step S311.

In step S311, the control processor 310 determines whether a predetermined condition has been satisfied. Here, the predetermined condition is, for example, one of the following conditions.

(1) A cover of a location to which the battery 301 connected to the flash 300 is connected is opened, or the cover is unlocked.

(2) The cumulative total of operations that are equivalent to full charging of the main capacitor 302d under the first control condition has exceeded a predetermined number.

(3) The cumulative period of an operation in which the maximum current flows under the first control condition has exceeded a predetermined period.

When the predetermined condition has been satisfied, the process proceeds to step S312, and when the predetermined condition has not been satisfied, the process proceeds to step S303.

Processes of steps S304 and S305 are the same as the processes of steps S109 and S110 of FIG. 7, and processes of steps S312 to S314 are the same as the processes of steps S121 to S123 of FIG. 7; thus, a description of these processes are omitted.

As described above, according to the third embodiment, the identification information of the battery 301 is deleted when the predetermined condition has been satisfied before the determination about whether appropriate communication has been able to be performed is ended. This can prevent the problem that the control condition for the flash 300 cannot be updated even after the result of the determination about whether the communication function is normal is negative. Furthermore, the deletion from and the storage into the EEPROM are executed when necessary; this can suppress the number of times the deletion from and the storage into the EEPROM are executed.

As the predetermined condition, it is desirable to use a condition related to an operation of stopping the communication function, such as the removal of the battery 301, or a condition related to a continued operation under the first control condition, such as the use of the flash 300 at high current; however, the predetermined condition is not limited to the aforementioned examples.

[Fourth Embodiment] The first embodiment to the third embodiment have described a case where, when the result of the determination about whether the communication function is normal is negative after the operation of the flash 300 are started based on the identification information of the battery 301, notification is given to the user via, for example, display related to the battery 301 without interrupting the operation of the flash 300.

A fourth embodiment describes an example in which, when the result of the determination about whether the communication function is normal is negative after operation of the flash 300 is started, notification is given to the user actively. As a flowchart of the operation of the flash 300 is substantially the same as that of FIG. 7 describing the first embodiment, the fourth embodiment will be described using FIG. 7

In step S109, the control processor 310 starts the determination about whether the communication enabled battery 301 is capable of performing appropriate communication, and when the content of a response signal from the control processor 301b is not accurate, the process proceeds to step S121.

After the process proceeds to step S121 and the control processor 310 has deleted the identification information of the battery 301 from the EEPROM, the user is actively notified of the inability of the battery 301 to perform appropriate communication by executing at least one of the following (1) to (4) before making a transition to step S122.

(1) Provide a warning display.

(2) Ring a buzzer (make a warning sound).

(3) Prohibit an operation of charging the main capacitor 302d of the flash 300.

(4) Prohibit the flash 300 from emitting light.

Regarding the warning display (notification), display that is similar to the case of step S411 of FIG. 4 is performed, and the operation of the flash 300 are stopped. Executing at least one of the aforementioned (1) to (4) enables the user to promptly notice a defect in the communication function of the battery 301.

[Fifth Embodiment] Although the foregoing embodiments have described the flash 300 as an example of the electronic device according to the foregoing embodiments, the electronic device according to the foregoing embodiments is not limited to the flash 300, and the foregoing embodiments are widely applicable to electronic devices other than the flash 300 that communicates with the battery 301.

[Sixth Embodiment] Various functions, processes, or methods described in the first to fifth embodiments can also be realized by a personal computer, a microcomputer, a CPU (Central Processing Unit), a microprocessor, or the like with use of a program. Hereinafter, in a sixth embodiment, a personal computer, a microcomputer, a CPU (Central Processing Unit), a microprocessor, or the like are referred to as a "computer X". Furthermore, in the sixth embodiment, a program that is intended to control the computer X and is intended to realize various functions, processes, or methods described in the first to fifth embodiments is referred to as a "program Y".

Various functions, processes, or methods described in the first to fifth embodiments are realized by the computer X executing the program Y. In this case, the program Y is supplied to the computer X via a computer-readable storage medium. The computer-readable storage medium according to the sixth embodiment includes at least one of a hard disk apparatus, a magnetic storage apparatus, an optical storage apparatus, a magneto-optical storage apparatus, a memory card, a volatile memory, a nonvolatile memory, or the like.

The computer-readable storage medium according to the sixth embodiment is a non-transitory storage medium.

While features of the disclosure are described with reference to exemplary embodiments, it is to be understood that the invention is not limited to the exemplary embodiments. The scope of the following claims is to be accorded the broadest interpretation so as to encompass all such modifications and equivalent structures.

This application claims the benefit of Japanese Patent Application No. 2020-093675, filed May 28, 2020 which is hereby incorporated by reference herein in its entirety.

What is claimed is:

1. An electronic device comprising:
a central processing unit (CPU) that executes a program stored in a memory and causes the electronic device to function as:
a communication unit that communicates with a battery connected to the electronic device and receives second identification information of the battery from the battery;
a storage unit that stores a first identification information of the battery;
a control unit that performs a predetermined control of a predetermined setting for restricting an operation of the electronic device, in a case where the second identification information received by the communication unit is matched with the first identification information stored in the storage unit; and
a determination unit that determines whether the communication unit is capable of performing a predetermined communication with the battery, in a case where the second identification information is matched with the first identification information,
wherein the control unit deletes the first identification information stored in the storage unit and performs a different control different from the predetermined control in setting for restricting the operation of the electronic device, in a case where the determination unit determines that the communication unit is incapable of performing the predetermined communication with the battery.

2. The electronic device according to claim 1, wherein the different control is control with more restrictions for the operation of the electronic device than the predetermined control.

3. The electronic device according to claim 1, wherein the different control includes at least one of increasing a setting value of an operation prohibition voltage that prohibits the operation of the electronic device, reducing an operation current value of the electronic device, changing a temperature setting value that restricts the operation of the electronic device, and changing a temperature detection unit used in restricting the operation of the electronic device.

4. The electronic device according to claim 1, wherein the control unit gives notification to a user in a case where the different control is started.

5. The electronic device according to claim 1, wherein the control unit performs at least one of (i) making an inquiry to a user about whether to use the electronic device, to a display unit, (ii) making of a warning sound, and (iii) placement of a restriction on the operation of the electronic device, in a case where the communication unit is incapable of performing the predetermined communication with the battery.

6. The electronic device according to claim 1, wherein the control unit controls the determination unit to determine whether the communication unit is capable of performing the predetermined communication with the battery in a case where no identification information that is matched with the second identification information is stored in the storage unit, and stores the second identification information of the battery in the storage unit if it is determined by the determination unit that the communication unit is capable of performing the predetermined communication with the battery.

7. The electronic device according to claim 1, wherein the determination unit determines whether the communication unit is capable of performing the predetermined communication with the battery by performing a battery authentication process.

8. The electronic device according to claim 7, wherein the determination unit transmits a predetermined encryption code to the battery via the communication unit and determines whether a content of a response signal from the battery is appropriate.

9. The electronic device according to claim 1, wherein the determination unit performs the determination after the predetermined control is started.

10. The electronic device according to claim 1, wherein the electronic device is capable of being attached to an image capture apparatus.

11. The electronic device according to claim 1, further comprising:
a positive electrode;
a negative electrode;
a communication port,
wherein power from the battery is received via the positive electrode and the negative electrode and the electronic device is operated with the power received from the battery, and
wherein the communication unit communicates with the battery via the communication port.

12. The electronic device according to claim 1, wherein the electronic device is a flash.

13. A method comprising:
communicating with a battery connected to an electronic device and receiving second identification information of the battery from the battery via a communication unit of an electronic device;
performing a predetermined control of a predetermined setting for restricting an operation of the electronic device, in a case where the second identification information received from the battery is matched with a first identification information stored in a storage unit of the electronic device;
determining whether the communication unit is capable of performing a predetermined communication with the battery, in a case where the second identification information is matched with the first identification information; and
deleting the first identification information stored in the storage unit of the electronic device and performing a different control different from the predetermined control in setting for restricting the operation of the electronic device, in a case where the determining determines that the communication unit is incapable of performing the predetermined communication with the battery.

14. The method according to claim 13, wherein the different control is control with more restrictions for the operation of the electronic device than the predetermined control.

15. The method according to claim 13, wherein the different control includes at least one of increasing a setting value of an operation prohibition voltage that prohibits the operation of the electronic device, reducing an operation current value of the electronic device, changing a temperature setting value that restricts the operation of the electronic device, and changing a temperature detection unit used in restricting the operation of the electronic device.

16. The method according to claim 13, further comprising:
controlling the determining to determine whether the communication unit is capable of performing the predetermined communication with the battery in a case where no identification information that is matched with the second identification information is stored in the storage unit; and
storing the second identification information of the battery in the storage unit if it is determined by the determining that the communication unit is capable of performing the predetermined communication with the battery.

17. The method according to claim 13, wherein the determining determines whether the communication unit is capable of performing the predetermined communication with the battery by performing a battery authentication process.

18. The method according to claim 17, wherein the determining transmits a predetermined encryption code to the battery via the communication unit and determines whether a content of a response signal from the battery is appropriate.

19. The method according to claim 13, wherein the determining performs the determination after the predetermined control is started.

20. A non-transitory storage medium that stores a program causing a computer to execute a method, the method comprising:
communicating with a battery connected to an electronic device and receiving second identification information of the battery from the battery via a communication unit of an electronic device;
performing a predetermined control of a predetermined setting for restricting an operation of the electronic device, in a case where the second identification information received from the battery is matched with a first identification information stored in a storage unit of the electronic device;
determining whether the communication unit is capable of performing a predetermined communication with the battery, in a case where the second identification information is matched with the first identification information; and
deleting the first identification information stored in the storage unit of the electronic device and performing a different control different from the predetermined control in setting for restricting the operation of the electronic device, in a case where the determining determines that the communication unit is incapable of performing the predetermined communication with the battery.

* * * * *